(12) United States Patent
Robertson et al.

(10) Patent No.: US 10,187,229 B2
(45) Date of Patent: Jan. 22, 2019

(54) BI-DIRECTIONAL, FULL-DUPLEX DIFFERENTIAL COMMUNICATION OVER A SINGLE CONDUCTOR PAIR

(71) Applicant: TEXAS INSTRUMENTS INCORPORATED, Dallas, TX (US)

(72) Inventors: Maxwell Guy Robertson, Dallas, TX (US); Casey Ryan McCrea, San Jose, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 149 days.

(21) Appl. No.: 15/452,227

(22) Filed: Mar. 7, 2017

(65) Prior Publication Data
US 2017/0257208 A1 Sep. 7, 2017

Related U.S. Application Data

(60) Provisional application No. 62/304,876, filed on Mar. 7, 2016.

(51) Int. Cl.
*H04L 25/02* (2006.01)
*H04L 5/16* (2006.01)
*H04L 25/08* (2006.01)
*H04L 5/14* (2006.01)
*H04L 1/00* (2006.01)

(52) U.S. Cl.
CPC .............. *H04L 25/028* (2013.01); *H04L 5/16* (2013.01); *H04L 1/0029* (2013.01); *H04L 5/143* (2013.01); *H04L 5/1461* (2013.01); *H04L 25/0272* (2013.01); *H04L 25/085* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,014,768 A | * | 1/2000 | Lee | H04L 1/0054 714/746 |
| 7,330,514 B1 | * | 2/2008 | Ahmad | H04B 3/32 375/257 |
| 2005/0069067 A1 | * | 3/2005 | Zerbe | H04L 25/4917 375/353 |
| 2006/0245508 A1 | * | 11/2006 | Takamuku | H03K 19/018578 375/257 |
| 2006/0291405 A1 | * | 12/2006 | Karam | H04L 12/10 370/284 |
| 2008/0139154 A1 | * | 6/2008 | Behzad | H04B 7/0811 455/277.2 |

(Continued)

*Primary Examiner* — Warner Wong
(74) *Attorney, Agent, or Firm* — John R. Pessetto; Charles A. Brill; Frank D. Cimino

(57) ABSTRACT

Circuits for full duplex bi-directional differential communication via a single conductor pair. A transceiver for full duplex differential communication over a single conductor pair includes a differential driver, a polarity neutral receiver, and receiver output circuitry. The differential driver is to drive the conductor pair. The polarity neutral receiver is to detect signals present on the conductor pair. The receiver output circuitry is configured to determine a logic value to be output by the transceiver as received via the conductor pair based on an output of the polarity neutral receiver and a logic value driven onto the conductor pair by the differential driver.

20 Claims, 3 Drawing Sheets

(56) References Cited

U.S. PATENT DOCUMENTS

| | | | | |
|---|---|---|---|---|
| 2009/0108872 A1* | 4/2009 | Suenaga | H04L 25/028 | 326/82 |
| 2009/0182909 A1* | 7/2009 | Hollis | G06F 13/4273 | 710/60 |
| 2012/0002573 A1* | 1/2012 | Ceekala | H04L 5/1461 | 370/276 |
| 2012/0002711 A1* | 1/2012 | Kota | H04B 15/00 | 375/232 |
| 2012/0294397 A1* | 11/2012 | Umeda | H04L 7/042 | 375/343 |
| 2012/0299653 A1* | 11/2012 | Scott | H04L 25/0272 | 330/253 |
| 2013/0194978 A1* | 8/2013 | Andersson | H04B 1/50 | 370/278 |
| 2013/0202061 A1* | 8/2013 | Chandrasekaran | H04L 25/06 | 375/317 |
| 2013/0223293 A1* | 8/2013 | Jones | H04L 5/14 | 370/276 |
| 2013/0257513 A1* | 10/2013 | Sanchez | H03F 3/45381 | 327/404 |
| 2013/0287084 A1* | 10/2013 | Bankman | H03F 3/45076 | 375/229 |
| 2014/0009245 A1* | 1/2014 | Din | H04B 1/525 | 333/129 |
| 2014/0211832 A1* | 7/2014 | Diab | H04L 25/0266 | 375/219 |
| 2016/0358695 A1* | 12/2016 | Kim | H04L 25/085 | |
| 2017/0077876 A1* | 3/2017 | Quilligan | H03F 3/45475 | |

* cited by examiner

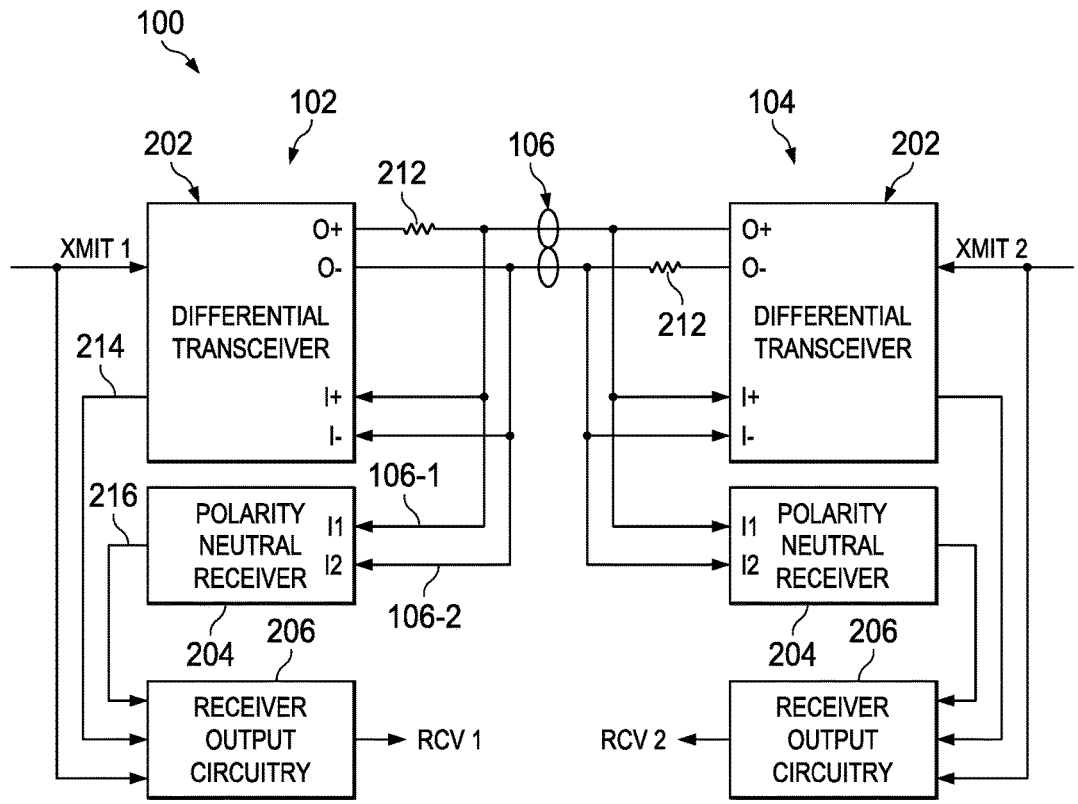
FIG. 6
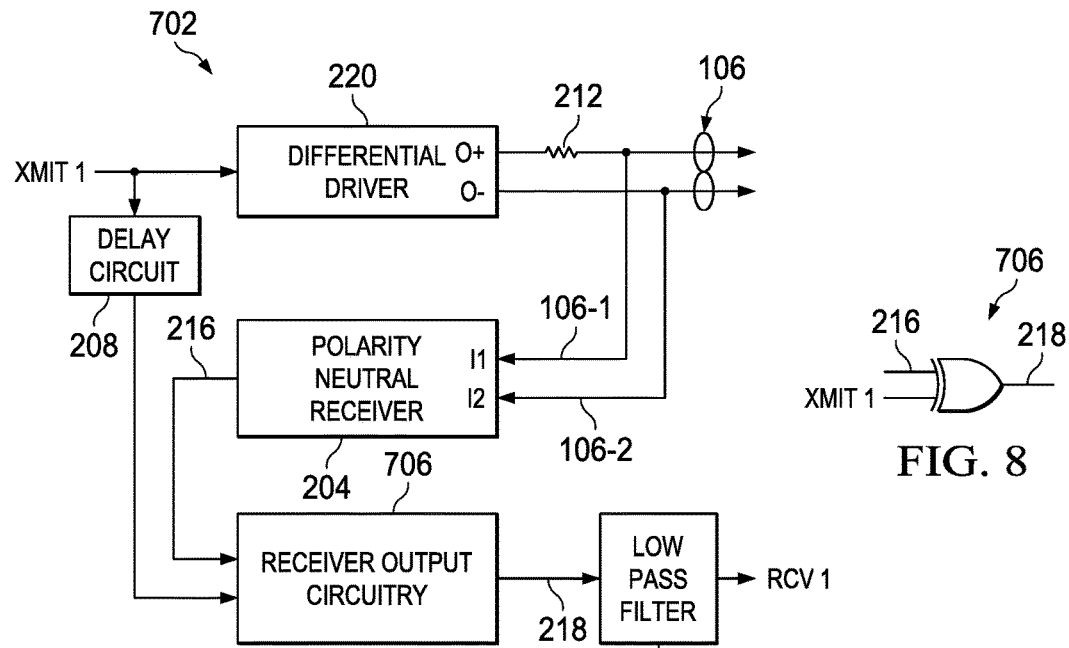
FIG. 7
FIG. 8

BI-DIRECTIONAL, FULL-DUPLEX DIFFERENTIAL COMMUNICATION OVER A SINGLE CONDUCTOR PAIR

CROSS-REFERENCE TO RELATED APPLICATIONS

The present application claims priority to U.S. Provisional Patent Application No. 62/304,876, filed Mar. 7, 2016, titled "Bi-Directional, Full-Duplex Differential Communication Over a Single Conductor Pair," which is hereby incorporated herein by reference in its entirety.

BACKGROUND

Differential signaling is often used to provide communication over long distances or in electrically noisy environments. To accommodate communication between multiple nodes, systems that employ differential signaling may be implemented to provide half-duplex or full-duplex communication. Half-duplex communication may be implemented using a single pair of conductors coupled to each of the differential transmitters and receivers of each node. In haft-duplex communication systems, a control service is typically provided to ensure that only one of the differential transmitters is active at any given time. Full duplex communication may provide for a higher rate of overall data transfer by allowing two differential drivers to transmit at any given time, each on a different pair of conductors. Accordingly, full duplex differential signaling typically provides an increase in system bandwidth but requires use of two pairs of conductors to connect the differential transceivers.

SUMMARY

Circuits for full duplex bi-directional differential communication via a single conductor pair are disclosed herein. In one embodiment, a circuit for full duplex communication includes a first transceiver circuit, and a second transceiver circuit communicatively coupled to the first transceiver circuit via a conductor pair for full duplex data transfer between the first transceiver circuit and the second transceiver circuit. The first transceiver circuit includes a differential driver, a polarity neutral receiver, and receiver output circuitry. The differential driver is to drive the conductor pair. The polarity neutral receiver is to detect signals present on the conductor pair. The receiver output circuitry is configured to determine a logic value driven onto the conductor pair by the second transceiver circuit based on an output of the polarity neutral receiver and a logic value driven onto the conductor pair by the differential driver.

In another embodiment, a transceiver for full duplex differential communication over a single conductor pair includes a differential driver, a polarity neutral receiver, and receiver output circuitry. The differential driver is to drive the conductor pair. The polarity neutral receiver is to detect signals present on the conductor pair. The receiver output circuitry is configured to determine a logic value to be output by the transceiver as received via the conductor pair based on an output of the polarity neutral receiver and a logic value driven onto the conductor pair by the differential driver.

In a further embodiment, a transceiver for full duplex differential communication over a single conductor pair includes a differential driver, a differential receiver, a differential window detector, and receiver output circuitry. The differential driver is to drive the conductor pair. The differential receiver is to detect signals present on the conductor pair. The differential window detector is configured to determine whether an output of the differential driver is in conflict with an output of a different device driving the conductor pair. The receiver output circuitry is configured to determine a logic value to be output by the transceiver as received via the conductor pair based on an output of the differential receiver, an output of the differential window detector, and a logic value driven onto the conductive pair by the differential driver.

BRIEF DESCRIPTION OF THE DRAWINGS

For a detailed description of various examples, reference will now be made to the accompanying drawings in which:

FIG. 6 shows a more detailed view of the system of FIG. 1 using the transceivers of FIG. 2;

FIG. 7 shows a block diagram of a transceiver suitable for use in a full duplex bi-directional differential communication system using a single conductor pair in accordance with various embodiments; and FIG. 8 shows a schematic diagram of receiver output circuitry suitable for use in the transceiver of FIG. 7 in accordance with various embodiments.

DETAILED DESCRIPTION

Certain terms are used throughout the following description and claims to refer to particular system components. As one skilled in the art will appreciate, different companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct wired connection. Thus, if a first device couples to a second device, that connection may be through a direct connection or through an indirect connection via other devices and connections.

Conventional full-duplex differential signaling employs four conductors. For example, one pair of conductors is used to communicate in each direction between a pair of transceivers. As the distance between transceivers increases, an inordinate portion of overall system cost may be related to the cost of the conductors connecting the transceivers. The transceiver circuits disclosed herein enable full-duplex bidirectional differential communication using only two conductors, thereby allowing for a substantial reduction in conductor cost relative to conventional systems. The transceivers detect contention on the conductor pair and determine the state of the signal to be received by the transceiver based on the state of the signal being transmitted by the transceiver.

Figure 1:
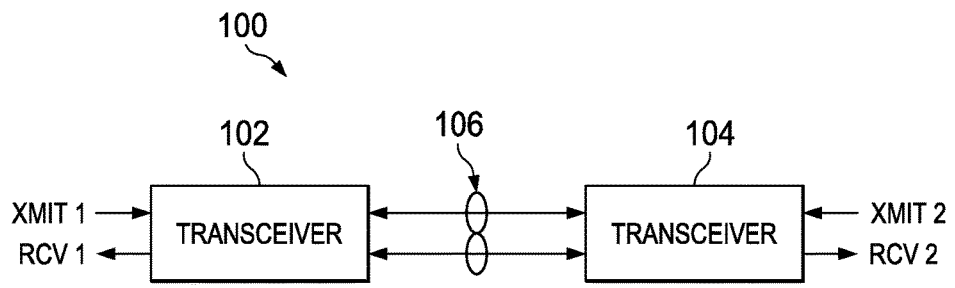
FIG. 1 shows a block diagram of a full duplex bi-directional differential communication system using a single conductor pair in accordance with various embodiments.

FIG. 1 shows a block diagram of a full duplex bi-directional differential communication system 100 using a single conductor pair in accordance with various embodiments. The system 100 includes a first transceiver 102 and a second transceiver 104 communicatively connected by a single conductor pair 106. The conductor pair 106 may be, for example, a pair of intertwisted wires. The transceiver 104 may be substantially similar to the transceiver 102. Each of the transceivers 102 and 104 may simultaneously transmit to and receive from the other transceiver via the single conductor pair 106. Data transmitted or received by a transceiver 102 or 104 may be provided by or to other circuits or systems that employ the transceivers 102 and 104 to communicate. For example, industrial control systems or distributed data acquisition systems may incorporate the transceivers 102 and 104 for communication via the single conductor pair 106.

Figure 2:
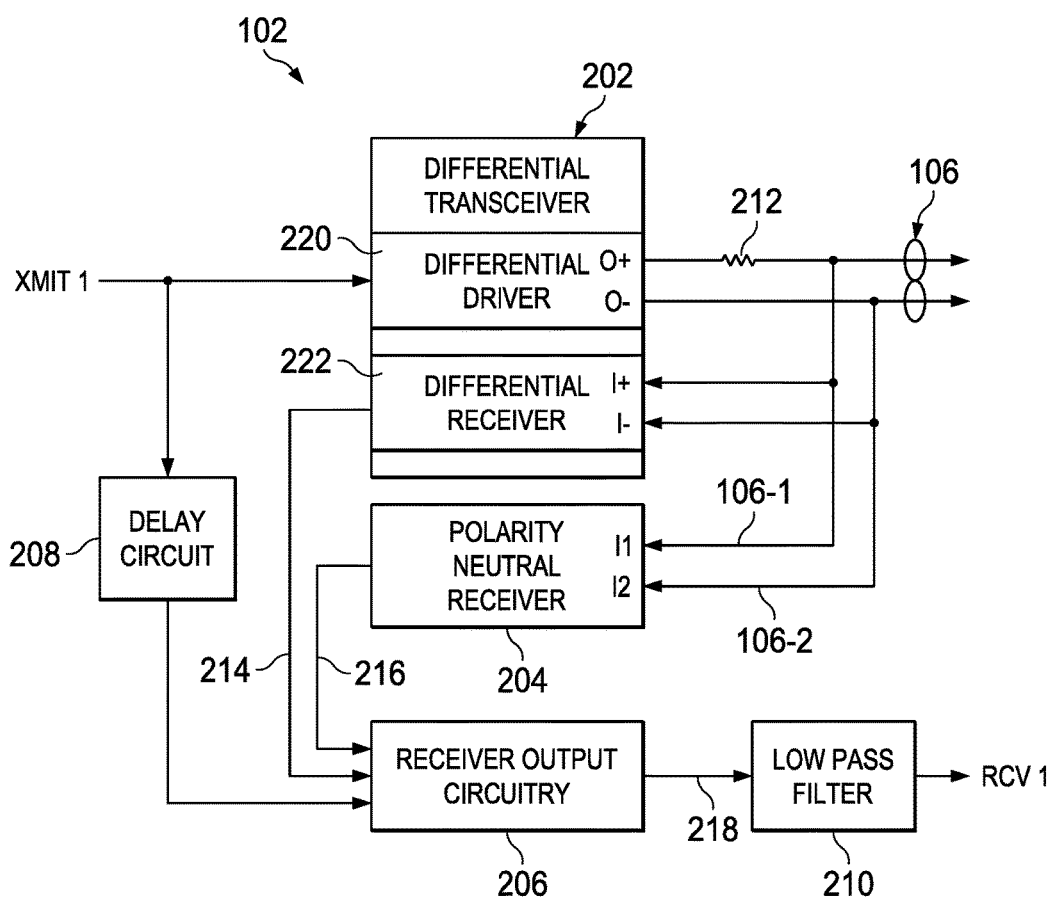
FIG. 2 shows a block diagram of a transceiver suitable for use in a full duplex bi-directional differential communication system using a single conductor pair in accordance with various embodiments.

FIG. 2 shows a block diagram of the transceiver 102. The transceiver 104 may be substantially similar to the transceiver 102. Accordingly, description of the transceiver 102 may generally apply to the transceiver 104. The transceiver 102 includes a differential transceiver circuit 202, a polarity neutral receiver circuit 204, and receiver output circuitry 206. The differential transceiver 202 includes a differential driver 220 and a differential receiver 222. The differential driver 220 drives an output corresponding to input signal XMIT 1 onto the conductor pair 106. For example, a first logic state (e.g., "1") received on signal XMIT1 may cause the differential driver 220 to drive a positive voltage differential across the conductor pair 106. Similarly, a second logic state (e.g., "0") received on signal XMIT1 may cause the differential driver 220 to drive a negative voltage differential across the conductor pair 106. Thus, input signal XMIT may be indicative of a logic state at which differential driver 220 is to drive the conductor pair 106.

The differential receiver 222 detects signals on the conductor pair 106 and produces an output signal 214 representative of the differential signal on the conductor pair 106. For example, a positive voltage differential across the conductor pair 106 may cause the differential receiver 222 to assert a first logic state (e.g., "1") on the output signal 214, and a negative voltage differential across the conductor pair 106 may cause the differential receiver 222 to assert a second logic state (e.g., "0") on the output signal 214.

An output of the differential driver 220 is connected to a resistor 212. The resistor 212 limits current flow in the differential driver 220 to prevent damage to the driver 220 when the transceivers 102 and 104 are driving conflicting signals onto the conductor pair 106. The resistor 212 may have a resistance of, for example, 30 ohms. One terminal of the resistor 212 is connected to a first output (e.g., O+) of the differential driver 220, and the other terminal of the resistor 212 is connected to one conductor 106-1 of the conductor pair 106. A second output (e.g., O−) of the differential driver 220 may be connected to a conductor 106-2 of the conductor pair 106. A first input (e.g., I+) of the differential receiver 222 is connected to the second terminal of the resistor 212, and a second input (e.g., I−) of the differential receiver 222 is connected to the second output of the differential driver 220. In some embodiments of the transceiver 102, the differential transceiver 202 may be a device, such as the SN65HVD3083 by Texas Instruments, Incorporated or a similar device.

The polarity neutral receiver 204 detects signals on the conductor pair 106 and drives the output signal 216 based on the detected signals. A first input (e.g., I1) of the polarity neutral receiver 204 is connected to the second terminal of the resistor 212, and a second input (e.g., I2) of the polarity neutral receiver 204 is connected to the second output of the differential driver 220. The polarity neutral receiver 204 may drive the output signal 216 to a first logic state (e.g., "0") based on voltage differential across the conductor pair 106 exceeding a predetermined value. Similarly, the polarity neutral receiver 204 may drive the output signal 216 to a second logic state (e.g., "1") based on voltage differential across the conductor pair 106 being less than a predetermined value. Such operation allows the polarity neutral receiver 204 to operate as a contention detector that detects whether the transceivers 102 and 104 are driving conflicting signals onto the conductor pair. If the polarity neutral receiver 204 detects a voltage differential that is less than predetermined value on the conductor pair 106, then the transceivers 102 and 104 are driving conflicting signals onto the conductor pair 106, otherwise the transceivers 102 and 104 are not driving conflicting signals onto the conductor pair 106. Thus, the output 216 of the polarity neutral receiver 204 identifies contention on the conductor pair 106. In some embodiments of the transceiver 102, the polarity neutral receiver 204 may be a device, such as the SN65HVD96 by Texas Instruments, Incorporated or a similar device. The polarity neutral receiver 204 may also be referred to as a differential window detector because the polarity neutral receiver 204 drives the output signal 216 to the second logic state (e.g., "1") based on voltage differential across the conductor pair 106 being within a predetermined window (or range), e.g., 500 mv, and otherwise drives the output signal 216 to the first logic state. Thus, output signal 216 may indicate whether the voltage differential across the conductor pair 216 is within a predetermined window or range of voltages, which may further indicate whether or not contention is present on the conductor pair 106.

In some embodiments of the transceiver 102, resistors 212 may be used to connect both outputs of the differential driver 220 to the conductor pair 106. That is, a first resistor 212 may connect a first output (e.g., O+) of the differential driver 220 to a first conductor of the conductor pair 106, and a second resistor 212 may connect a second output (e.g., O−) of the differential driver 220 to a second conductor of the conductor pair 106. The inputs of the differential receiver 222 and the polarity neutral receiver 204 may be connected to the conductor pair 106 (i.e., connected to the terminals of the resistors 212 that are connected to the conductor pair 106 and not connected to the terminals of the resistors 212 that are connected to the differential driver 220).

Figure 3:
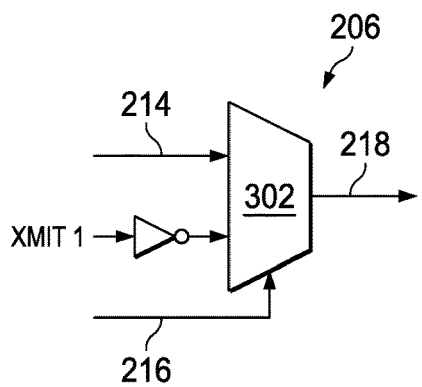
FIG. 3 shows a schematic diagram of receiver output circuitry suitable for use in the transceiver of FIG. 2 in accordance with various embodiments.

The receiver output circuitry 206 is coupled to the differential transceiver 202 and the polarity neutral receiver 204. The receiver output circuitry 206 determines the logic state of signal driven onto the conductor pair 106 by the transceiver 104 based on the state of the output signals 214 and 216 produced by the differential receiver 222 and the polarity neutral receiver 204 and the state of the differential transceiver input signal XMIT1. FIG. 3 shows a schematic diagram for an embodiment of the of receiver output circuitry 206. The receiver output circuitry 206 includes a selector 302. The selector 302 selects from signal 214 output by the differential transceiver 202 and an inverted version of the signal XMIT1 driven onto the conductor pair 106 by the differential driver 220. Selection is controlled by the signal 216 output by the polarity neutral receiver 204. If the signal 216 indicates that contention is present on the conductor pair 106, then the selector 302 selects the inverted version of the signal XMIT1. If the signal 216 indicates that contention is not present on the conductor pair 106, then the selector 302 selects the signal 214. Thus, if the transceivers 102 and 104 are driving the same logic state onto the conductor pair 104, the state of the signal RCV1 is same as the state of the signal present on the conductor pair 106. On the other hand, if the transceivers 102 and 104 are driving different logic states onto the conductor pair 104, the state of the signal RCV1 is the inverse of the state of the signal driven onto the conductor pair 106 by the differential transceiver 202.

Figure 4:
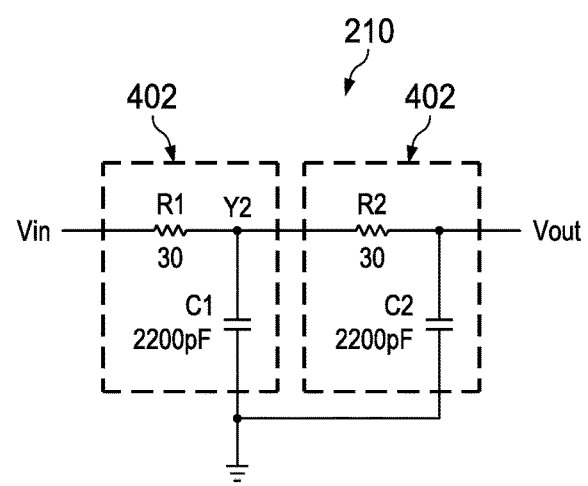
FIG. 4 shows a schematic of a low-pass filter suitable for use in transceiver of a full duplex bi-directional differential communication system using a single conductor pair in accordance with various embodiments.

The output of the receiver output circuitry 206 may be subject to transients caused by the response of the polarity neutral receiver 204 to transitions of the differential signals on the conductor pair 106, and by delay from transition of the signal XMIT1 to transition of the signals 214 and 216. Some embodiments of the transceiver 102 may include a low pass filter 210 coupled to the output of the receiver output circuitry 206 to reduce the amplitude of the transients. The low pass filter 210 may be, for example, a second order low pass filter. FIG. 4 shows a schematic of a low-pass filter 210 suitable for use in a transceiver 102. The second order low pass filter 210 shown in FIG. 4 includes a pair of cascaded R-C low pass filters 402. The resistance and capacitance values of the filters 402 may be varied as needed to filter the signal 218.

To reduce transients caused by delay from transition of the signal XMIT1 to transition on the signals 214 and 216, some embodiments of the transceiver 102 may include a delay circuit 208 to compensate for the timing difference between the signal XMIT1 and the signals 214 and 216. For example, an embodiment of the delay circuit 208 may delay the signal XMIT1 provided to the receiver output circuitry 206 by a time equal to the propagation delay of the differential driver 220 and/or the propagation delay of the differential receiver 222 in the differential transceiver 202, and/or the propagation delay of the polarity neutral receiver 204.

Figure 5:
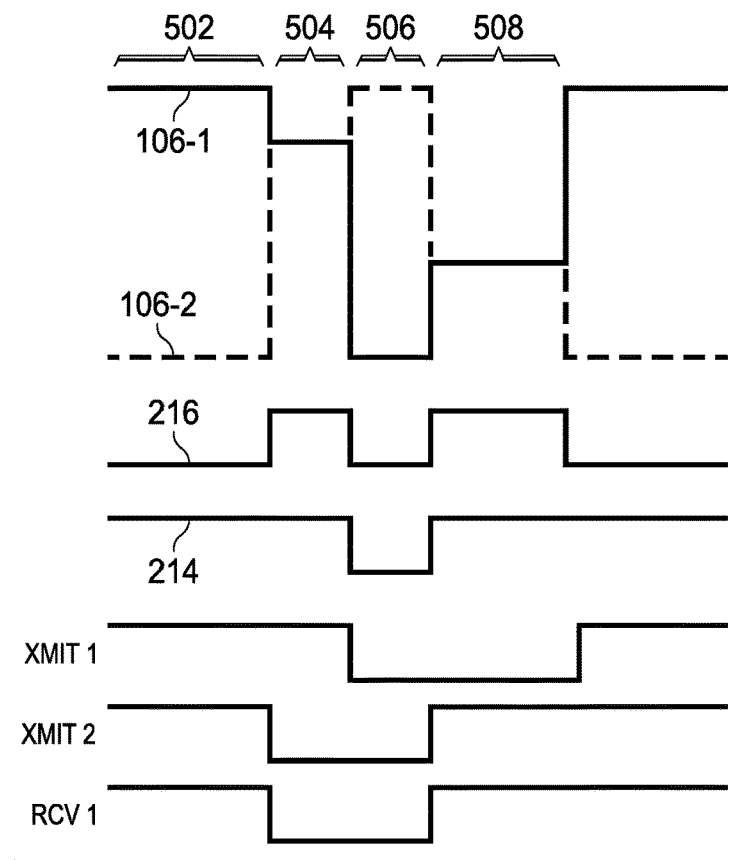
FIG. 5 shows a diagram of signals in a full duplex bi-directional differential communication system using a single conductor pair in accordance with various embodiments.

FIG. 5 shows a diagram of signals in the transceivers 102 and 104. The input signals to the transceivers 102 and 104 are shown as XMIT1 and XMIT2 respectively. The signals 106-1 and 106-2 resulting from driving XMIT1 and XMIT2 onto the conductor pair 106 show that in time intervals 502 and 506 the transceivers 102 and 104 are driving a same signal state, and in time intervals 504 and 508 the transceivers 102 and 104 are driving different signal states. Thus, in time intervals 502 and 506 there is no contention on the conductor pair 106, and in time intervals 504 and 508 there is contention on the conductor pair 106. The polarity neutral receiver 204 asserts (sets to a logic "1") the signal 216 during the time intervals 504 and 508 because the voltage difference between the signals 106-1 and 106-2 is small. In time intervals 502 and 506, the polarity neutral receiver 204 negates (sets to a logic "0") the signal 216 because the voltage difference between the signals 106-1 and 106-2 is large. The differential transceiver 202 output signal 214 is asserted during time intervals 502, 504, and 508, and negated during time interval 506.

The receiver output circuitry 206 outputs the inverse of XMIT1 while signal 216 is asserted and outputs signal 214 while signal 216 is negated. Thus, the output RCV1 of the receiver output circuitry 206 is the same as the signal XMIT2 driven onto the conductor pair 106 by the transceiver 104.

FIG. 6 shows a more detailed view of the system of FIG. 1 using the transceivers of FIG. 2. In FIG. 6, the differential transceiver 202, current limiting resistor 212, polarity neutral receiver 204, and receiver output circuitry 206 of each transceiver 102 and 104 is shown. Each transceiver 102, 104 applies the current limiting resistor 212 to a different conductor of the conductor pair 106. For example, the transceiver 102 applies the resistor 212 to the conductor 106-1, and the transceiver 104 applies the resistor 212 to the conductor 106-2. In some embodiments of the system 100, the transceivers 102 and 104 are continuous enabled to drive the conductor pair 106. That is, the differential drivers 220 are never tri-stated.

FIG. 7 shows a block diagram of a transceiver 702 suitable for use in the full duplex bi-directional differential communication system 100 in accordance with various embodiments. The transceiver 702 is an embodiment of the transceiver 102 and is generally similar to the transceiver 102. The transceiver 702 differs from the transceiver 102 in the following respects. The receiver 702 may lack a differential receiver 222. Accordingly, differential transceiver 202 may be replaced by the differential driver 220. The receiver output circuitry 706 determines the logic state of signal driven onto the conductor pair 106 by the transceiver 104 based on the state of the output signal 216 produced by the polarity neutral receiver 204 and the state of the differential driver 220 input signal XMIT1.

FIG. 8 shows a schematic diagram of receiver output circuitry 706 suitable for use in the transceiver 702 in accordance with various embodiments. The receiver output circuitry 706 may be implemented as a controllable inverter that outputs an inverted or uninverted version of the signal XMIT1 with selection based on the output 216 of the polarity neutral receiver 204. The output 218 of the receiver output circuitry 706 is an uninverted version of the signal XMIT while the signal output 216 of the polarity neutral receiver 204 indicates that no conflict is detected on the conductor pair 106. The output 218 of the receiver output circuitry 706 is an inverted version of the signal XMIT while the signal output 216 of the polarity neutral receiver 204 indicates that conflict is detected on the conductor pair 106. In some embodiments, the receiver output circuitry 706 may implemented as an exclusive OR gate.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A circuit for full duplex communication, comprising:
a first transceiver circuit; and
a second transceiver circuit communicatively coupled to the first transceiver circuit via a single conductor pair for full duplex data transfer between the first transceiver circuit and the second transceiver circuit;
wherein the first transceiver circuit comprises:
a differential driver to drive the conductor pair;
a polarity neutral receiver to detect signals present on the conductor pair; and
receiver output circuitry configured to determine a logic value driven onto the conductor pair by the second transceiver circuit based on an output of the polarity neutral receiver and a logic value driven onto the conductor pair by the differential driver.

2. The circuit for full duplex communication of claim 1, wherein the first transceiver circuit comprises a differential receiver to detect signals present on the conductor pair; and the receiver output circuitry is configured to determine the logic value driven onto the conductor pair by the second transceiver circuit based on an output of the differential receiver.

3. The circuit for full duplex communication of claim 2, further comprising:
a first resistor in series with a first output of the differential driver and a first conductor of the conductor pair, wherein the first output of the differential driver is connected to a first terminal of the first resistor, and a first input of the differential receiver is connected to a second terminal of the first resistor;
a second resistor in series with a first output of the second transceiver circuit and a second conductor of the conductor pair, wherein the first output of the second transceiver circuit is connected to a first terminal of the second resistor, and a first input of the second transceiver circuit is connected to a second terminal of the second resistor;
wherein a second input of the differential receiver is coupled to a second output of the differential driver, and a second input of the second transceiver circuit is coupled to a second output of the second transceiver circuit.

4. The circuit for full duplex communication of claim 1, wherein each of the first transceiver circuit and the second transceiver circuit is configured to continuously drive the conductor pair.

5. The circuit for full duplex communication of claim 1, wherein the first transceiver circuit further comprises a low-pass filter coupled to an output of the receiver output circuitry.

6. The circuit for full duplex communication of claim 1, further comprising:
a first resistor in series with a first output of the differential driver and a first conductor of the conductor pair, wherein a first output of the differential driver is connected to a first terminal of the first resistor, and a first input of the polarity neutral receiver is connected to a second terminal of the first resistor; and
wherein a second input of the polarity neutral receiver is coupled to a second output of the differential driver.

7. The circuit for full duplex communication of claim 1, further comprising a delay circuit coupled to the receiver output circuitry and configured to delay presentation to the receiver input circuitry by an amount of time equivalent to propagation delay through the differential driver and the polarity neutral receiver an input signal to be driven by the differential driver.

8. A transceiver for full duplex differential communication over a single conductor pair, the transceiver comprising:
a differential driver to drive the conductor pair;
a polarity neutral receiver to detect signals present on the conductor pair; and
receiver output circuitry configured to determine a logic value to be output by the transceiver as received via the conductor pair based on an output of the polarity neutral receiver and a logic value driven onto the conductor pair by the differential driver.

9. The transceiver of claim 8, further comprising a differential receiver to detect signals present on the conductor pair; wherein the receiver output circuitry is configured to determine the logic value driven onto the conductor pair by a different transceiver based on an output of the differential receiver.

10. The transceiver of claim 9, further comprising:
a resistor in series with a first output of the differential driver, the resistor for connection to a first conductor of the conductor pair,
wherein the first output of the differential driver is connected to a first terminal of the resistor, and a first input of the differential receiver is connected to a second terminal of the resistor;
wherein a second input of the differential receiver is coupled to a second output of the differential driver.

11. The transceiver of claim 8, wherein the differential driver is configured to continuously drive the conductor pair.

12. The transceiver of claim 8, further comprising a low-pass filter coupled to an output of the receiver output circuitry.

13. The transceiver of claim 8, further comprising:
a resistor in series with a first output of the differential driver, the resistor for connection to a first conductor of the conductor pair,
wherein the first output of the differential driver is connected to a first terminal of the resistor, and a first input of the polarity neutral receiver is connected to a second terminal of the resistor;
wherein a second input of the polarity neutral receiver is coupled to a second output of the differential driver.

14. The transceiver of claim 8, further comprising a delay circuit coupled to the receiver output circuitry and configured to delay presentation, to the receiver input circuitry, of an input signal representing a logic value to be driven by the differential driver, by an amount of time equivalent to propagation delay through the differential driver and the polarity neutral receiver.

15. A transceiver for full duplex differential communication over a single conductor pair, the transceiver comprising:
a differential driver to drive the conductor pair;
a differential receiver to detect signals present on the conductor pair;
a differential window detector configured to determine whether an output of the differential driver is in conflict with an output of a different device driving the conductor pair; and
receiver output circuitry configured to determine a logic value to be output by the transceiver as received via the conductor pair based on an output of the differential receiver, an output of the differential window detector, and a logic value driven onto the conductive pair by the differential driver.

16. The transceiver of claim 15, wherein the receiver output circuitry is configured to:
provide the output of the differential receiver as the logic value to be output by the transceiver based on differential window detector identifying no conflict; and
provide an inverse of the logic value driven onto the conductive pair by the differential driver based on the differential window detector identifying conflict.

17. The transceiver of claim 15, wherein the differential window detector is a polarity neutral receiver circuit.

18. The transceiver of claim 15, wherein the differential driver is configured to continuously drive the conductor pair.

19. The transceiver of claim 15, further comprising one or more of:
a low-pass filter coupled to an output of the receiver output circuitry; or a delay circuit coupled to the receiver output circuitry and configured to delay presentation, to the receiver input circuitry, of an input signal representing a logic value to be driven by the differential driver, by an amount equivalent to propagation delay through the differential driver and the differential receiver.

20. The transceiver of claim 15, further comprising:
a resistor comprising a first terminal connected to a first output of the differential driver and a second terminal for connection to a first conductor of the conductor pair, wherein:
   the second terminal of the resistor is connected to a first input of the differential receiver and to a first input of the differential window detector; and
   a second output of the differential driver is coupled to a second input of the differential receiver and a second input of the differential window detector.

\* \* \* \* \*